(12) United States Patent  (10) Patent No.: US 12,406,594 B2
Chen  (45) Date of Patent: Sep. 2, 2025

(54) SYMMETRIC DODECAPHONIC HARMONY MUSIC NOTATION SYSTEM (71) Applicant: Yaodong Chen, Belmar, NJ (US)

(72) Inventor: Yaodong Chen, Belmar, NJ (US)

(*) Notice: Subject to any disclaimer, the term of this patent is extended or adjusted under 35 U.S.C. 154(b) by 98 days.

(21) Appl. No.: 18/025,891

(22) PCT Filed: Sep. 15, 2020

(86) PCT No.: PCT/CN2020/115428
§ 371 (c)(1),
(2) Date: Mar. 11, 2023

(87) PCT Pub. No.: WO2022/056695
PCT Pub. Date: Mar. 24, 2022

(65) Prior Publication Data
US 2023/0260422 A1  Aug. 17, 2023

(51) Int. Cl.
G09B 15/02 (2006.01)
G10G 1/00 (2006.01)

(52) U.S. Cl.
CPC ............ G09B 15/02 (2013.01); G10G 1/00 (2013.01)

(58) Field of Classification Search
CPC .................. G09B 15/02; G10G 1/00
See application file for complete search history.

(56) References Cited

U.S. PATENT DOCUMENTS

| 104,393 | A | * | 6/1870 | Wright | G10G 1/00 84/483.1 |
| 832,406 | A | * | 10/1906 | Naunton | G10G 1/00 84/483.1 |
| 1,424,718 | A | * | 8/1922 | Fee | G10G 1/00 84/483.1 |
| 1,473,495 | A | * | 11/1923 | Miller | G10G 1/00 84/428 |
| 1,947,686 | A | * | 2/1934 | Walsh | G09B 15/00 D19/64 |
| 5,549,029 | A | * | 8/1996 | Lepinski | G09B 15/004 84/478 |
| 5,574,238 | A | * | 11/1996 | Mencher | G09B 15/026 84/478 |
| 5,998,721 | A | * | 12/1999 | Lepinski | G09B 15/004 84/483.2 |
| 9,378,654 | B2 | * | 6/2016 | Batiste | G10G 1/00 |
| 9,607,591 | B2 | * | 3/2017 | Batiste | G09B 15/023 |
| 11,810,539 | B2 | * | 11/2023 | Sikangwan | G09B 15/026 |
| 2006/0150803 | A1 | * | 7/2006 | Taub | G10H 1/0008 84/616 |
| 2007/0221043 | A1 | * | 9/2007 | Hao | G09B 15/004 84/477 R |

(Continued)

FOREIGN PATENT DOCUMENTS

CN 109256108 A * 1/2019

Primary Examiner — Robert W Horn (57) ABSTRACT

The present invention relates to a symmetrical dodecaphonic harmony notation system for 12 ET based music, abbreviated as SymD notation. One of the most predominant characteristics of SymD notation is a staff of 5 lines arranged symmetrically with 8 space settings between and beside the lines for all 12 semitones and its octave in a 12 ET scale. The staff serves as a visual reference for intervallic harmony relationships in sonority and melody progressions in 12 ET music.

9 Claims, 4 Drawing Sheets (56) References Cited

U.S. PATENT DOCUMENTS

| | | | |
|---|---|---|---|
| 2008/0072738 A1* | 3/2008 | Plamondon | G10G 1/00 |
| | | | 84/423 R |
| 2009/0064847 A1* | 3/2009 | Hao | G09B 15/004 |
| | | | 84/483.2 |
| 2010/0180752 A1* | 7/2010 | MacCoy | G09B 15/02 |
| | | | 84/483.2 |
| 2015/0248878 A1* | 9/2015 | Lippens | G10H 1/0016 |
| | | | 84/483.2 |
| 2021/0082303 A1* | 3/2021 | Billman | G09B 15/02 |
| 2023/0089269 A1* | 3/2023 | Sikangwan | G10G 1/04 |
| | | | 84/483.2 |
| 2023/0260422 A1* | 8/2023 | Chen | G10G 1/00 |
| | | | 84/477 R |

* cited by examiner

SYMMETRIC DODECAPHONIC HARMONY MUSIC NOTATION SYSTEM

BACKGROUND 1. 12 Equal Tempered (12 ET) System

The term Dodecaphony used in this invention refers more generally to any set or subset of the 12 music notes in 12 ET system.

Goethe stated "it is actually equal temperament that makes truly satisfying music of a higher kind possible, nature notwithstanding." Johann Wolfgang von Goethe, *Scientific Studies,* 43. Well-formed equal temperament scales have been explored in 5, 7, 12, 17, 29, 41, and 53 equal divisions of the octave. Chinese musicians learned how to tune by natural fifths and developed pentatonic scale more than 3,000 years ago. Eventually, the Chinese extended more fifths to complete the full 12-tone cycle of fifths, similar to the 12 ET scale.

12 ET system is deemed to be satisfying and has been well accepted. 12 ET system offers good match to the natural harmony structure with flexibility and richness. The benefits of 12 equal intervals, the cycles of modulation, the manageable number of tones and the even division of the octave into 2, 3, 4 and 6 parts have overcome the shortcomings of its imperfect thirds, sixths and sevenths with respect to natural harmonies.

Theoretically, 12 Equal temperament tones were produced by stepwise perfect fifths movements in the sharp and flat directions to be joined into an enharmonic circle, which is different from just harmony based on one tonic root. The 12 ET notes therefore are independent from natural tonality.

Contemporary music demonstrates a change from fixed tonality to kinetic tonality. The relativistic aspect of the 12 ET harmony structure makes it possible to consider intervallic harmonies locally, without relating them to a single tonal root.

2. Music Notation System

The idea of using symbols to represent sounds in music notations elevated music to a high art. The current system of musical notation used in Western classical music has facilitated sophisticated polyphonic music as we have seen today.

Figure 1:
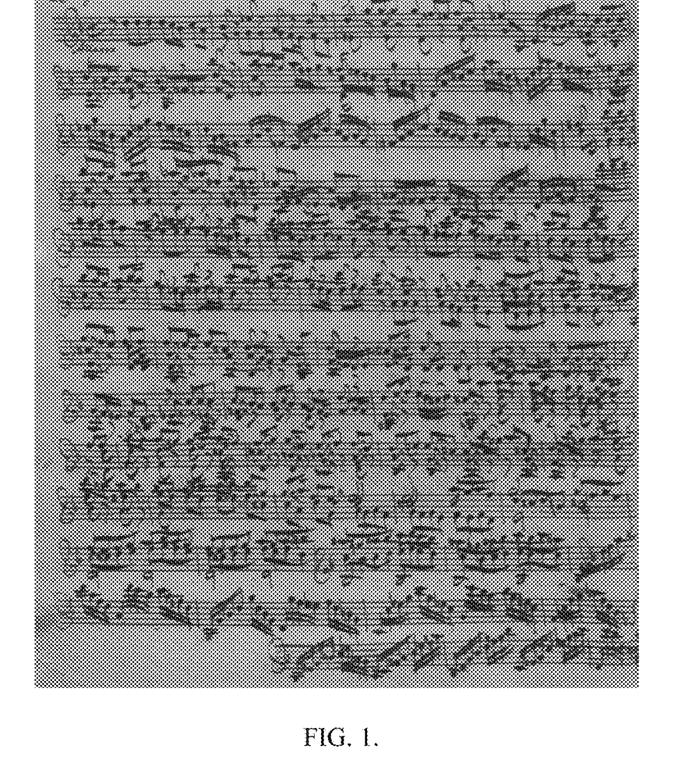
FIGS. 1, 2 & 3, J. S. Bach's autograph transcription of his Sonata I for Unaccompanied Violin (BMV 1001), beginning of second movement, written in 1720, and its excerpt's notations in both the conventional notation system and the present SymD notation system.

Western conventional music notation was born with tonality. In ninth or tenth century, a horizontal line was drawn representing the standard tone of the music piece, which is typically the tonality root setting the horizon for the melodic contour. Along the development of chorus, a second horizontal line above the first representing the interval of a $5^{th}$ was added. Later, a line was drawn between the two, representing intervals of a third. Current standard notation system was shaped in the seventeenth century, and we'd have little difficulty interpreting the scores hand written by Bach in the early eighteenth century, see FIG. 1.

Since the traditional Western music notation was designed for tonal music with diatonic scales, it falls short of representing atonal music or music with 12 ET features. Out of scale sharp and flat notes are notated with accidentals that musician have to adjust mentally to figure out the exact noted to be played. Furthermore, despite the fundamental role of intervals in music, traditional music notation is focused on displaying and controlling pitches rather than intervals, i.e. the notes' locations on the staff indicate the notes' pitches. The focus on the pitches of diatonic scales brings several inconsistencies to the conventional notation system—the note locations are not consistent on the staff between clefs, octaves and keys, because the interval spacing isn't consistent. These inconveniences have forced some instrumental music to be notated in different notation conventions.

Figure 9:
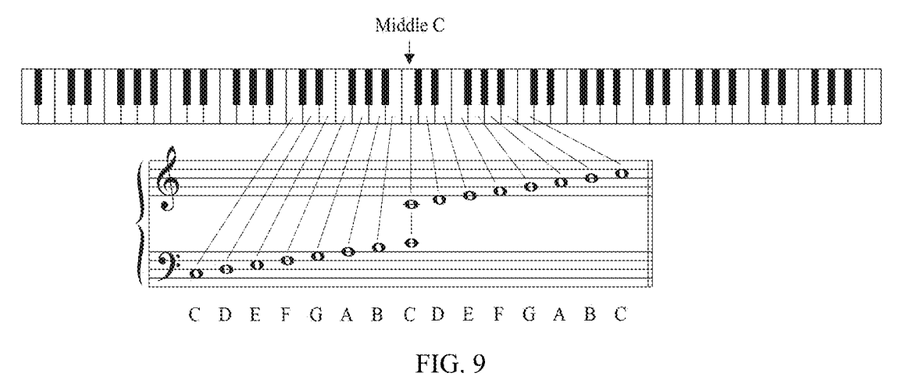
FIG. 9, is a illustration of common piano keyboard with keys set for the 12 tones in 12 ET system, relating to the notes on a grand staff of the conventional notation in fixed correspondences.

Standard pianos are tuned in 12 ET system, which means that the interval between any two adjacent keys (white or black) is the same, called a semitone. A grand staff of the conventional notation shows the fixed correspondence between note locations and the keys on a common piano keyboard. See FIG. 9.

After the invention of the printing press in the sixteenth century, music notation become standardized and established. Any alteration comes to be seen as a violation of the norm, and the resistance against changes has made any modification, even small variations, difficult to be accepted.

In the music society, music notation is a link of complex two-way interactions between how composers organize and communicate the work, and how it is observed and interpreted by the musicians. Since music appreciation is a process of dynamic harmonic pattern recognition, music scores presented in a harmony structured notation system are valuable for understanding music. The staff representing intervallic harmonic patterns in the present SymD notation system is designed to be a harmony reference framework, which helps to reveal the fundamental harmonic relationships underlying music work.

THE INVENTION

Intervals of tones and the rhythm of tones' inceptions define music. Music intervals are frequency proportions, which are not tied to any specific pitches. Music may be transposed to any pitch or key; its identity is retained so long as the intervals' relationships are preserved.

The intervals in most music nowadays are well-tempered 12 ET intervals, not Just or Pythagorean intervals, due to the de facto 12 ET standard of instrument designs. The surrounding music in 12 ET system enables the 12 ET tones to be independent from natural tonality. The individualized 12 ET notes can now have their own harmony perspectives based on their temporary regional intervallic interactions, and establish a more dynamic harmonic space.

Music notation can be free from keys/pitches and focus on tonal intervals. Different from the traditional music notation system tied with diatonic pitches, SymD notation is 12 ET interval oriented. SymD staff is designed with a systematic line/space pattern to be a reference frame for 12 ET intervallic harmony in a symmetric manner, which may facilitate a straightforward recognition of harmonic progression in a piece of music.

1. The SymD Unit Staff

The unit staff in SymD notation system is a symmetric grid related to dodecaphonic harmony structure for music scores in 12 ET system. The staff is based on natural harmonic series and built on 12 ET intervals.

The SymD unit staff is designed to have a grid of 5 parallel lines arranged symmetrically with respect to a center line, wherein 3 lines including the center line are in a middle line group defining two even spaces in between, 2 peripheral lines each at one side beside and each sets a gap with the middle line group; these two gaps are in same width with each other, but wider than the two spaces in the middle line group, and each gap is divided evenly into two spaces with an inner space beside the middle line group, and an outer space beside the peripheral line; there are additional two outside spaces each outside one of the 2 peripheral lines; thus, 13 locations are formed on said 5 lines and in said 8 spaces.

These 13 note locations symmetrically arranged on the SymD staff are assigned to 12 notes in an octave and a note of the octave in a 12 ET scale consecutively, starting from a tonic note at the location of an outside space beside one peripheral line, continuing to a tritone note at the location of the center line, up to the octave note of the tonic at the location of the other outside space beside the other peripheral line.

Figure 4:
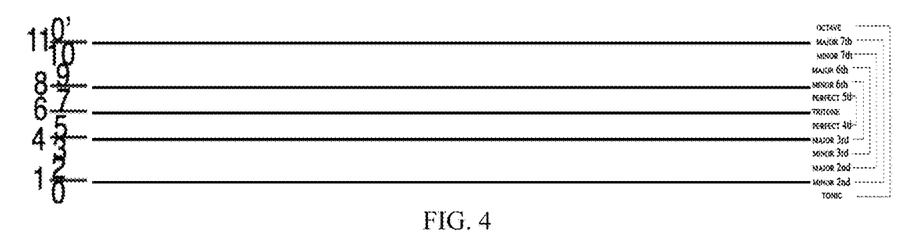
FIG. 4, is a diagram illustrating an SymD unit staff, along with the numeric indicia for the note locations.

In one embodiment as in FIG. 4, the 13 locations on a horizontal extended SymD unit staff are identified consecutively ascending from the space below the bottom peripheral line of the staff as 0, up to 12/0', the space above the top peripheral line. This series of locations are assigned with the 12 ET notes and its first octave, starting with the tonic note associated with the location 0. Thus, the consecutively ascending 12 ET note keys within an octave are associated with consecutively ascending locations with indicia 0, 1, 2, 3, 4, 5, 6, 7, 8, 9, 10 and 11, respectively.

Different from the conventional notation system, each semitone note occupies a discrete line or space on the SymD unit staff of the present invention, there are no need for accidentals such as sharps or flats for semitones outside of a diatonic scale. Further, in SymD notation, the first note of the octave is specified to be Note 0. Note 0 isn't pitch dependent and has nothing to do with the pitch C. Pitch C can be notated anywhere on the staff, depending on the key.

Conventional staff and some of the alternative staves are not cyclic, which makes the note locations are not consistent between octaves and cannot be stacked together without staff line overlapping or ledger line adding. Perfect cyclic stacking of the unit staff with visual clarity requires the unit staff has a precise octave cycle on the top and bottom spaces, not on the lines. SymD unit staff is designed strictly octave cyclic, with periodical octave note locations on the ending spaces, so that all notes in octave interval appears at the same location on the unit staff. Therefore, SymD unit staff for successive octave can be stacked seamlessly due to its perfect octave periodicity. A SymD staff with two SymD unit staves stacked together can be seen in FIG. 5.

2. Naming of Notes and Solmization

There is no international standard for specific names of notes. Although any system for naming single notes of scales can be used, a number-based system of 0-11 is chosen for naming the 12-ET notes in the present invention, as a preferred embodiment, which assigns a single number to each semitone note with the tonic note starts as 0. Hence, 0, 1, 2, 3, 4, 5, 6, 7, 8, 9, 10, 11, 0' are SymD notes for the set of 12 ET notes in one octave.

Other numbering system can also be used, for example, naming the tritone note on the middle line location 3 as the Origin and naming other notes in the flat side as −1, −2, −3, −4, −5, −6 or i, ii, iii, iv, v, vi and the notes in the sharp side as 1, 2, 3, 4, 5, or I, II, III, IV, V and the octave 6 or VI. This mirror-image numbering system focuses on the SymD's symmetric center tritone, which gives a tone a self-centered symmetric harmony reference with respect to its Tritone note.

| Pitch Name | Solfege | Functionality (Diatonic) | Pitch Class | SymD Note Set | SymD Harmonic Degree | SymD Mirror Image Interval Set |
|---|---|---|---|---|---|---|
| D' | | | | 12/0' | OCTAVE | VI |
| $^b$D'/#C' | | | | 11 | MAJOR SEVENTH | V |
| C' | 8/1 (DO/UT) | TONIC | 0' | 10 | MINOR SEVENTH | IV |
| B | 7 (TI) | LEADING TONE | 11 | 9 | MAJOR SIXTH | III |
| $^b$B/#A | $^b$7/#6 (LI) | | 10 | 8 | MINOR SIXTH | II |
| A | 6 (LA) | SUBMEDIANT | 9 | 7 | FIFTH | I |
| $^b$A/#G | $^b$6/#5 (SI) | | 8 | 6 | TRITONE | O |
| G | 5 (SO) | DOMINANT | 7 | 5 | FOURTH | i |
| $^b$G/#F | $^b$5/#4 (FI) | | 6 | 4 | MAJOR THIRD | ii |
| F | 4 (FA) | SUBDOMINANT | 5 | 3 | MINOR THIRD | iii |
| E | 3 (MI) | MEDIANT | 4 | 2 | MAJOR SECOND | iv |
| $^b$E/#D | $^b$3/#2 (RI) | | 3 | 1 | MINOR SECOND | V |
| D | 2 (RE) | SUPER TONIC | 2 | 0 | PRIME | vi |
| $^b$D/#C | $^b$2/#1 (DI) | | 1 | 11 | (minor second) | V |
| C | 1 (DO/UT) | TONIC | 0 | 10 | (major second) | IV |

It is noted that in the present invention, the staff locations numbered 0-12/0' with a single semitone step between any consecutive locations is set for a pitch interval of 100 cents. Therefore, the location associated notes in SymD numbering system are abstract relative notes, not pitch specific per se. Therefore, these number named notes are pitch independent regardless of the key signature. These staff location associated notes can be tied with particular pitches when a pitch is specified with any particular location.

In SymD notation system, number named notes can also be seen as the interval steps between the numbered note to the tonic note. Different from traditional music theory, we introduce "0" as the name for the interval unison. Similar to the mathematic numerical system, the introduction of 0 combines the function of naming a point with the function of indicating a distance, the naming of a tone note with the tonic/unison interval as 0, unifies the system of note names and note intervals with respect to the tonic. The interval step between two so named notes can simply be the difference value by subtraction. Hence SymD notation makes note intervals explicit, which helps the understanding of harmony configuration in chords and scales.

The diatonic solfa method is commonly used for singing the notes. In the present invention, the solfage names for singing is also the notes' 0-11 number names. Any local pronunciation of these numbers can be used for the singing solmization of these notes, although for those numbers pronouncing in multiple syllables may need to be simplified into one for easy singing and recognition.

Therefore, in a preferred embodiment of the present SymD notation system, the number 0-11 is used for the locations of the note on the staff, the names of the notes, the solfege syllables for the note voicing, and the interval step of the notes with respect to the tonic 0. SymD notation system thus merges note staff location identifier, note name, note solfage, and note interval distance all together into a unified numerical naming system. This system is interval focused and staff location based, which makes it easier to understand the intervallic harmony mentally and visually. SymD staff isn't only a grid sheet for recording music, but also a harmony reference framework for learning and creating music.

Due to the cohering power of equal temperament, which divides the octave to 12 identical intervals, and the generating mechanism of circle of fifths, which produces 12 tones in stepwise circles, there is a dual identity of interval and note in 12 ET system for the numeric names in SymD notation. We therefore don't explicitly distinguish the meanings of the number used, which include the dodecaphonic note itself, its staff location and its interval distance from its tonic in the unified SymD naming system.

It should be noted that the use of numeral index to name the notes in 12 ET scale in the present SymD notation system implies no tonality. The SymD staff is designed as a framework for the on-going harmony events in the intervals of tones along the music progression, which is the background gravity for the harmony in both tonal and atonal music.

3. The Design and Usage of the SymD Notation System

Tonality comprises of component concepts of root centricity, diatonicism and functional harmony, which forms a multi-layered structure. In Rameau's tonic-centric gravitational model in *Génération harmonique* (1737), the harmonic spectrum in 12 ET based scale is generated from a central tonic, based on two pairs of opposed relations: upper/lower dominants and parallel/relative major-minor, forming four fundamental, generative relations.

SymD notation is meant to represent the 12 ET harmony spectrum in a lattice structure based on a modified Rameau model. In the same way that Rameau's model on the upper/lower dominants surrounding the tonic, SymD flips the static tonal harmony centered on tonic root to a symmetrically structured referential harmony center on the tritone note.

1) Structural Harmony

Figure 10:
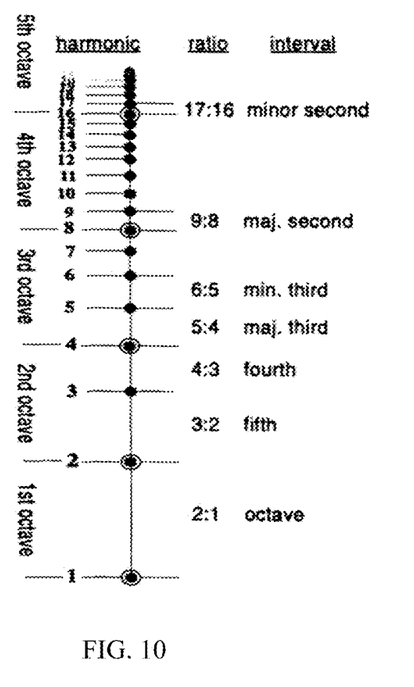
FIG. 10, An illustration of the tones from tonic to its $20^{th}$ harmonic pitches in the natural harmony spectrum.

The tones from tonic to its $20^{th}$ harmonic pitches occur in the natural harmony spectrum is shown in FIG. 10. In this static harmony space, those intervals in a 12 ET scale with simpler numeric relation to the tonic pitch, such as 2:1 octave, 3:2 fifth, 4:3 fourth, etc., provide the backbone structure of musical harmony. The more distant tones in the harmony series provide modulatory color for the melodic articulation in the music.

Natural harmony space is a fundamental background for any music genre. Although atonal music avoids tonality purposefully by not establishing a root relationship, every note is still surrounded with a naturally occurred harmony space. SymD notation is a reference framework for such individual harmony perspectives.

Figure 11:
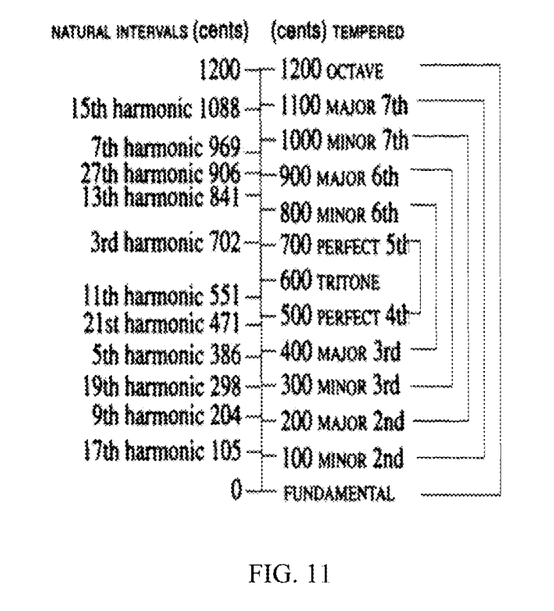
FIG. 11, An illustration showing the relationship between natural harmony series and the corresponding tone intervals in 12 ET system.

In the late 1880's, Alexander Ellis devised a system in which the octave was divided into 1200 "cents", with each cent denoting $\frac{1}{1200}^{th}$ of an octave. In modern twelve-tone equal-temperament tuning, all twelve semitones in an octave are of equal width of 100 cents each. The relationship between natural harmony series and the corresponding tonal intervals in 12 ET system can be seen at FIG. 11.

12 ET tones are produced under the provisions of octave periodicity and cycle of fifth. Comparing with natural harmonic interval series, the intervals in 12 ET system are not in perfect match, with the closest at $5^{th}$ and remotest at tritone. However, the 12 ET scale has equal proportional ratio of frequency between adjacent notes. The uniform frequency proportion in 12 ET makes the intervallic inter-relation transposable, free from a tonic root. These dodecaphonic ET notes have gained independent status as individual elements in modern music harmony.

The visible symmetric structure of the 12 ET harmonic spectrum is based on the temperamental equality of tones and the enharmonic equivalence of intervals. Seeing from FIG. 11, the 12 ET dodecaphonic scale displays a butterfly symmetry with respect to the tritone note.

In music theory, the tritone is defined as a musical interval composed of three adjacent whole tones (six semitones). Tritone has a pitch interval unit of 600 out of 1200 cents of the whole octave, which seats at an equal distance above the root tonic note and below its octave note. A tritone tone doesn't exist in the natural harmony series. It sounds restless, unresolved and creepy and so was christened diabolus in musica—the Devil in music.

However, tritone is crucial in the present SymD notation system in that it divides the octave in halves linearly and connects the two fifths dividing the octave harmonically. Tritone Note 6 can be deemed as a structural center point for the 12 ET dodecaphonic harmonic symmetry. In SymD, tritone is a harmony reference center holding the opposite gravities of dominant to the tonic and subdominant to the octave in balance, which maintains the whole 12 ET system in a dynamic equilibrium.

SymD notation's unit staff design is based on this butterfly symmetry with respect to 12 ET tritone note in its dodecaphonic harmony space. SymD notation system makes tritone note at location 6 a point for harmony reflections in the unit staff to serve as a transposable reference center for the harmony gravity field in a 12 ET octave. The transposibility with modulo equivalence in 12 ET notes enables the SymD unit staff to epitomize all intervallic harmony relations in all 12 ET music.

SymD unit staff can be stacked together to form a grand staff for multiple octaves. The equal tempered intervallic relationship in 12 ET scale can provide cross octave harmonic references. Because SymD's symmetric staff is also seamlessly octave cyclic, stacked staves form an expanded symmetric structure, covering the harmonic symmetry in multi-octave 12 ET scales.

The symmetrical presentation of the intervallic relationships reduces recognition burden by grouping the corresponding intervallic relations into harmonic equivalent pairs. When two unit staves stacking together, as in FIG. 5, it reveals another symmetric center at Location 0 (Note 0) in the harmonic relationship of two adjacent octaves.

2) Modes/Scales in SymD Notation System

In music theory, the diatonic scale's cyclical sequence of intervals has 7 different modes, each starting the same note sequence from a different cutting point. From the octave window of a SymD staff fixed with a tonic tone, diatonic scales in different keys can be viewed as different modes. For example, in C major scale, each of the modes are derived by stepwise cyclic shifts, which can be viewed corresponding to the major scores in different keys in a SymD unit staff notation.

For example, major scales seen from the window of a SymD unit staff, with its Note 0 fixed at Pitch D, as different modes are:

| | | | | | | | | |
|---|---|---|---|---|---|---|---|---|
| F | Aeolian (minor) | D/0 | E/2 | F/3 | G/5 | A/7 | B♭/8 | C/10 | D/0 |
| E♭ | Locrian | D/0 | E♭/1 | F/3 | G/5 | A♭/6 | B♭/8 | C/10 | D/0 |
| D | Ionian (Major) | D/0 | E/2 | F#/4 | G/5 | A/7 | B/9 | C#/11 | D/0 |

-continued

| | | | | | | | | |
|---|---|---|---|---|---|---|---|---|
| C | Dorian (Neutral) | D/0 | E/2 | F/3 | G/5 | A/7 | B/9 | C/10 D/0 |
| B♭ | Phrygian | D/0 | E♭/1 | F/3 | G/5 | A/7 | B♭/8 | C/10 D/0 |
| A | Lydian | D/0 | E/2 | F#/4 | G#/6 | A/7 | B/9 | C#/11 D/0 |
| G | MixoLydian | D/0 | E/2 | F#/4 | G/5 | A/7 | B/9 | C/10 D/0 |

Figure 12:
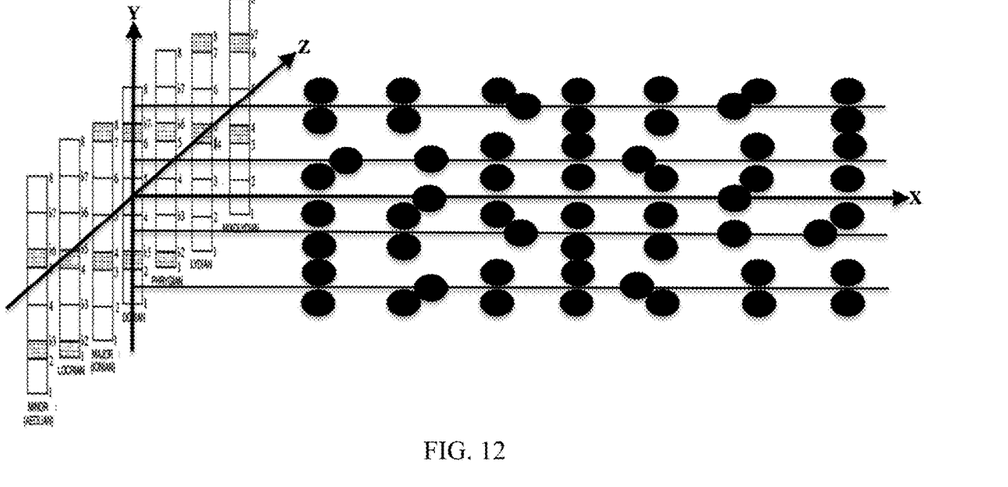
FIG. 12, A diagram showing the 12 ET harmonic space in 3D SymD notation system with Time Axis X, Sonority Axis Y and Scale Axis Z.

In an exemplified embodiment, when the Note 0 in a SymD unit staff is set to the pitch D, other major scales in the keys other than D may have their interval pattern on SymD unit staff as different modes, as in FIG. 12. This view may lose the sight of original key's standard static harmony symmetry, but the functional harmony with the notes instant intervallic relationships in the progression is still referenced by the staff and can be easily recognizable.

Seen in FIG. 12, a 12 ET diatonic harmony space represented in the SymD notation, includes 3 axes, wherein, the sonority harmonic intervals spanning vertically along Axis Y, and scale/mode harmonic sequences along Axis Z in the depth, unfolds along time Axis X into harmony progressions. The abstract sonority harmony structure along Axis Y, however, is maintained, which is represented as the SymD staff extending along the time Axis X, as a visible reference.

Different scales, such as harmonic minor, pentatonic, hexatonic, whole tone, etc, include or exclude a different subset of the 12 ET notes, thus produce a different circular pattern of intervals between the included notes. The sequences of selections and permutations of a full set or subset scale in 12 ET dodecaphonic system can be put along scale Axis Z, expanding the 12 ET harmony space into a $3^{rd}$ dimension.

Thus, a Symmetric Dodecaphonic ET musical space can be constructed in SymD notation system with:
 a. a first axis for rhythm & tempo, on which time is represented;
 b. a second axis for sonorities, substantially perpendicular to said time axis on which the width of 12 ET semitone intervals is represented as one unit in continuous octave cycles;
 c. a third axis for scale sets, perpendicular to above time axis and sonority axis, representing note sets or subsets of 12 ET notes in mode permutations;
 d. three axis crossed at the origin of Sonority Axis at the tritone or tonic note, with Scale Axis at a symmetric mode/scale with respect to the tritone when the origin of Sonority Axis is tritone, or at any mode in a scale when the origin of Sonority Axis is tonic, and with Time Axis at time 0.

Each mode in a diatonic scale provides a characteristic sound space which may be identified aurally, due to the location of its half-tones with respect to its tritone. Visually, based on the semitone locations, the 5 lines in SymD staff can serve as signature lines for the 7 different diatonic keys or modes, when occupied respectively. If no line is occupied, then it is a C major scale, or Dorian mode scale. Dorian has an archetypal self-symmetric structure with respect to Tritone, which is a non-directional neutral mode, a good origin layer in Axis Z for diatonic scales.

As emphasized above, SymD isn't a pitch focused notation system, it's a harmony structured abstract system for the note intervallic relationships. In a particular perspective, the SymD staff may be viewed as a combination of two traditional scales in Eastern and Western music culture respectively: the set of notes on the 5 lines matches the Chinese Pentatonic YU mode scale in a 12 ET presentation (which is also a minor pentatonic scale in western music terminology), and the set of notes in the spaces matches the Dorian mode of western diatonic scale, which also corresponds to the white key settings on a standard keyboard for D Dorian.

However, it shouldn't be interpreted in a way that a SymD staff is fixed to the pitch linked keyboard white keys in D Dorian setting, since it would conceal the structural harmony relationship and confuse the understanding of the music when the notation is set for a different key or mode. The scale in the key D is not regarded to have a close relationship with a C scale, because its tonic D is in a dissonant major second with tonic C. Further, Dorian mode isn't a commonly used mode, since it is a hybrid mode with both minor and major features with vague and non-directional sense. It should be clear that SymD staff's line and space arrangements are set for the 12 ET harmonic symmetry, not for D key's diatonic scales on a keyboard where the key combinations for its other 6 modes, including its major and minors, are not symmetrically set, and have to incorporate both black and white keys.

Because of Dorian scale's internal symmetric structure with respect to its tritone note, it matches the sonority harmonic symmetry in SymD music space, where Dorian mode is set as the origin layer on Axis Z crossing with Axis Y at tritone. Seeing from FIG. 12, on the scale Axis Z, Dorian mode is at the center of the mode sequence and other 6 diatonic modes are arranged besides by stepwise shifting of the scale intervals cyclically up or down.

In this diatonic scale on Axis Z, there are consecutively upside-down mirror image pairs formed symmetrically with respect to the Dorian origin: i.e. Aeolian/MixoLydian, Locrian/Lydian, and Ionian/Phrygian. These mirror image scale pairs are also in opposite major/minor relationships, with Dorian, a neutral mode, as the reflective symmetric center at the origin of Axis Z.

On a SymD staff, the patterns of scale/mode intervals are transposable, inter-related and consistently displayed. The symmetrical presentation of the patterns of the interval sets of different scales makes inter-scale harmonic relationship and intra-scale harmony structure easily discernable by reference.

3) Functional Harmony

The present SymD staff not only offers framework for structural harmony statics, it also provides instant reference for functional harmony dynamics in music progressions.

Music progression is a realization of harmonic events in time. In particular, the melodic tones claim their center of gravity and build up their sequential intervallic harmonic assemblies in contrast with the background harmony construction set up by the polyphonic sonorities or established tonal sequence in the past. The dynamic interactive tension therein and its relaxation in different level of resolution is the essence of music emotions.

Pitch intervals unfolded in rhythm express harmonic tension and relaxation driving sonority and melody continuation, prolongation and progression. The understanding of musical grammar must have a strong psychoacoustical basis on intervallic harmony relationships. SymD notation brings intervallic harmony reference to music scores.

The staff extending along time axis X is an accompanying harmonic reference lattice along the music progression, which reflects the intrinsic harmony configuration of functional regions in a piece of music. Referring to the staff lines, users can visually attend to the patterns of static gravity in the tonicization paradigmatics and the kinetic attraction in the modulation syntagmatics.

Via reference lines, SymD staff makes explicit archetypal tonic polarities in 12 ET dodecaphonic note set: a harmony spectrum divided into sections of degrees of tonicization and modulation, which manifests the fluctuations of the inter-note harmony tension in different regions in the music and in different layers of the 12 ET dodecaphonic harmony space.

The modulatory progressions involve semitone changes, which can be seen explicitly in the present SymD notation. These transformations are categorized as P (parallel), R (relative), and L (Leittonwechsel) in Neo-Riemannian theory. Such contextual transformations appear in both tonal and atonal music. There are four regions in Schoenberg's functional harmony chart—dominant, subdominant, relative, and parallel minor. Plus the ascending/descending leading tones, we have 5 key regions of harmony progression relations.

Based on 12 ET harmonic space's butterfly symmetry with respect to the tritone note and paired intervals with equivalent harmonic degrees from close to far, the five progressive regions in diatonic scales can be expanded to cover all 12 ET tones.

1) the upper and lower fifth regions: major scales based on dominant and subdominant (5 & 7) contain only one tone foreign to the principal tonic scale and whose generative triads share one common tones with the principal tonic triad at tonic or dominant. These regions display a high scale-content similarity to the principal key, and a moderate generative-triad commonality.

With respect to SymD staff representations, seen from the mode/scale Axis Z in FIG. 12, modes Aeolian and Mixolydian are closely related to the central mode Dorian taking its dominant and subdominant as their tonics.

2) relative regions: minor scales of major mediant and submediant (4 & 9), whose generative triads share two common tones with the principal tonic triad, and the scales contain zero or one tone foreign to the principal tonic scale. These regions display the highest scale-content similarity, and the highest generative-triad commonality to the principal key.

3) parallel regions: major scales of minor mediant and submediant (3 & 8), whose generative triads share one common tone with the principal tonic triad at dominant or tonic, and have three or four identical tones with the principal tonic scale. This region displays a moderate generative-triad commonality with the shared principal tonic key, and a moderate level of scale-content similarity.

Regions 2) & 3) are switching point for modality changes. With respect to a SymD staff representation, two side lines of the middle line group located at 3 & 8 and its adjacent spaces 4 & 9 are the switching joints for the changes between major/minor interval sets in paired modes of Ionian/Aeolian and MixoLydian/Phrygian.

Schoenberg says that "regions whose tonics differ by a major or minor second or augmented fourth (diminished fifth, or tritone)" are "irreconcilably remote." Modulations to the major or minor second, or tritone are rare in classic music. However, the major or minor second has the most melody attraction and Rameau considered the dissonant seventh to be the prime cause or primary motivator of any harmonic progression. Motifs built on seconds provide unique possibilities in music progressions. We therefore include these harmonically remote intervals to complete the symmetric harmony landscape presented by SymD staff:

4) region of L Lydian Split (Leittonwechsel split in Lydian scale): ascending leading tone and super tonic (2 & 11).
5) region of L Locrian (Leitonwechsel split in Locrian scale): descending leading tone and subtonic (1 & 10).

Scales built on regions 4) & 5) has low scale-content similarity and no generative-triad commonality.

Figure 13:
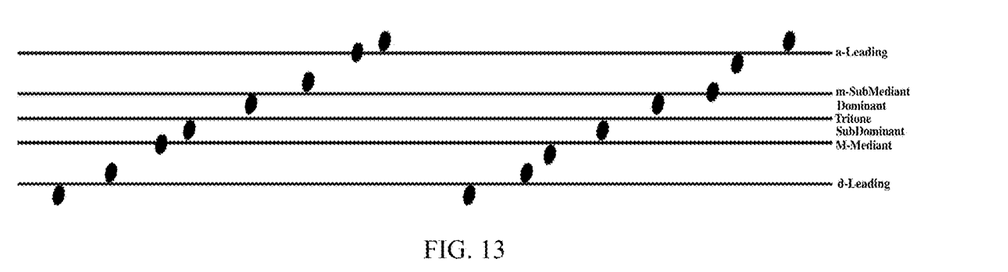
FIG. 13, A diagram showing 5 key regions with harmony significance indicated by 5 lines in SymD staff, with major (relative) and minor (parallel) scales notated.

These five regions are referenced by 5 lines in the present SymD notation staff, see FIG. 13, where the major (relative) and minor (parallel) scales switch configurations at mediant lines 4 & 8.

Of course, the most harmonic region is the Tonic/Octave region at 0 & 12/0'. They have total generative-triad commonality and the whole scale-content similarity. They provide a static harmony in unison, which has the least sense of music progression. In contrast, a region in harmonic singularity is the Tritone region, which has no generative-triad commonality and the least scale-content similarity. Mode scales containing tritone sound harsh due to the imperfect $4^{th}$ or $5^{th}$ intervals. However, tritone is getting popular in modern music and has become prominent in blues and jazz as one of the blue tones.

Figure 14:
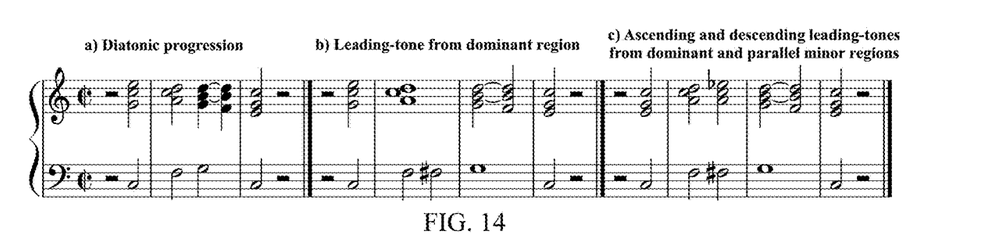
FIGS. 14 & 15, Standard harmony progressions notated in conventional notation, and in SymD notation.
Figure 15:
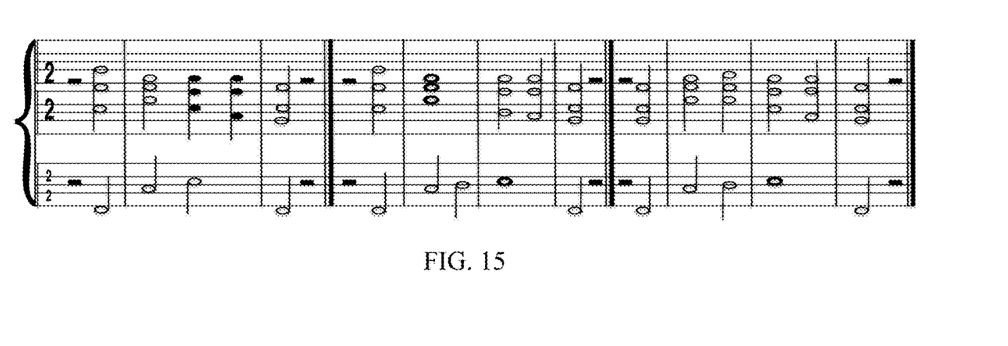

In FIG. 15, a grand SymD staff representation of several standard harmony progressions, along with the progressions in conventional notation in FIG. 14, are shown. The SymD representation has no key sign, which indicates an abstract score with the Note 0 as the tonic tone in a general 12 ET diatonic scale.

Because the explicit presentation of semitones and the symmetrical structure of interval relations in a SymD staff, one can see more clearly that at the regions of SubDominant and Dominant, tonality is more clearly established by a progression featuring the functional-syntactical model, i.e. tonic—pre-dominant—dominant—tonic (T-PD-D-T). At the regions of mediants and leading tones, the cords change properties between major/minor triads. The regions of mediants and leading tones are modulatory gateways to the parallel modes on Axis Z.

SymD staff presents above progressive relationship in harmony pairs in skewed symmetries, in a sequence of degrees with respect to Tritone 6. It is notable that the progressions are imbalance between the sharp and flat sides, with the pull inclining to the flat side for stability and the drive leaning to the sharp side for mobility.

Thus, the diatonic functional harmony progressions can be sorted in a symmetric way in three tiers ranging from close to remote from tritone center, and using SymD staff lines as reference grid:

1) Tier one with respect to the dominant reference line at Tritone 6: Dominant & SubDominant, which shows Line 6 being a tonality reference.
2) Tier two with respect to the mediant lines 4 & 8: major mediant vs. minor submidiant & minor mediant vs. major submidiant, which shows reference Lines 4 & 8 being a modality center as the switching points for major/minor and relative/parallel scales, see FIG. 13.
3) Tier three with respect to leading tone lines 1 & 11: super tonic & ascending leading tone vs. descending leading tone & subtonic, which shows Lines 1 & 11 being reference lines for melody directional movements.

In the SymD harmony space, these tiered regions may assert their own harmony domains through a cadence or other substantiations, which may form a secondary, transient harmony spaces having their own Axis Z layers, which interact dynamically with the global tonic layer in the background.

In summary, five symmetrically arranged staff lines in SymD notation define 3 tiers of functional harmony based on the 12 ET harmony's symmetric structure with respect to tritone, which can be made general for the whole dodecaphonic harmony space by transposition and cross reference.

The staff reveals both simultaneous and sequential harmonic relationships along the music progressions.

DESCRIPTION OF PREFERRED EMBODIMENTS

The present notation system concerns mostly the pitch domain, while other notation parameters—like grouping, rhythm, dynamics and timbre—are left to the conventional treatments in the standard notation system.

1. Other Markings

In a preferred embodiment, SymD notation utilizes all aspects of traditional Western notation, except for staff lines, clefs, key signatures and chord names. The conventions of Note heads, Stems, Flags, and Beams can all be preserved. All other traditional markings can be used in this notation, including but not limited to tempo markings, dynamics, slurs, and articulation markings. The rhythm representation in SymD notation may have the time-distance proportionality as in conventional notation. Alternatively, tempo units may be derived and displayed in computerized versions of the system, such as frames per beat for computer applications of the system.

In a preferred embodiment, time axis X is presented horizontally left-to-right for the passage of time. However, time axis in SymD has no mandatory orientation, it can also extend from top to bottom, or from right to left.

2. Key Indicators

Melody can have a sonority shift or transposition without losing its identity, so long as such shift preserves the characteristics of 12 ET intervals. In SymD notation system, since the staff locations are abstractly set for the note intervals, a desirable key can be assigned to the staff simply by defining the note 0 as a specific tonic key pitch, and the music score on the staff is transformed into a key specific score.

Figure 6:
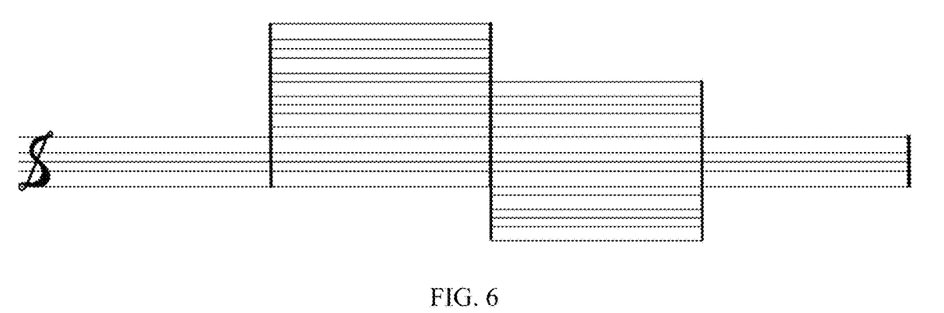
FIG. 6, is a diagram illustrating an augmented SymD staff, with D key symbol.

One way of tying the relative note location with a specific pitch key is using a clef symbol. In a preferred embodiment, A D key clef takes the form of a "S" with a vertical or slant bar across, and the tips of the bar are smoothly connected with the ends of S to form a small circle situated below the bottom line and above the top line, which indicates location 0 and 12/0' to be fixed with the pitch D as note 0 and its octave as note 0'. In this embodiment, SymD staff in the key D has its spaces set for notes matching D Dorian scale. Examples with this SymD clef key D can be seen in FIGS. 3, 6 & 7.

Symbol for other keys specifying other pitches as the tonic tone of the octave at location 0 can also be designed. Or simply, a standard key letter of the tonic pitch of a scale can be used directly to set the staff to the key by putting the key letter at location 0 at the beginning part of a SymD staff to fix the pitch-note relationship.

3. Microtones

Microtonal intervals are encountered in contemporary music. Microtones are typically perceived as variations of the standard 12-ET intervals. Therefore, sub-semitone microtones can be notated as altered semitones, usually as a fraction of the single semitone unit in cents up or down from the closest reference semitone. In SymD notation, one of the embodiments on microtone's presentation includes flat sign "b" or sharp sign "#" with a number of cents shifted put besides the note head or the note's numeric name. It can be a number of cents from 1 to 100 in one semitone 100 cents tone interval. The return sign "♮" in the conventional notation can be used in the same way to indicate the return to the referred semitone. For example, $6^{b20}$ indicates a down shift of 20 cents from the $7^{th}$ 12 ET tone represented as Note 6.

4. Modified Staff and Grand Staff

In the SymD unit staff, the uneven arrangement of lines and spaces in between and outsides are not only for the symmetric harmony relationship, but also for the different intervallic degrees. The width of the space between the top (and bottom lines) with the 3-line middle group is bigger than the space between the 3 lines, to accommodate two note heads stacked vertically, so that the minor third interval is clearly distinguishable. The distances between the top/bottom line and the middle line group shall be visibly wider. Preferably, the distance can be set at 3/2 to 3 times of the space distance between two adjacent lines in the middle line group.

It is often useful to notate music on multiple staves, for different hands, voices, or instruments. SymD unit staves can be stack together seamlessly to form multiple tiered staves. For polyphonic music, each group of unit staves is spaced from an adjacent staff or group by a distinguishably greater distance, so that the staves of different polyphonic portions are grouped together and separately notated. In FIG. 15, a grand SymD staff with music notation is shown, which comprises a stacked staff with two units for the treble portion and a beneath bass unit staff in a lower octave.

Figure 5:
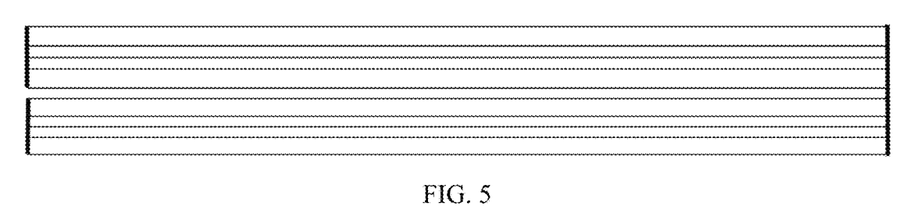
FIG. 5, is a diagram illustrating a stacked SymD staff.

An embodiment with a combination of stacked unit staves for notating music spanning beyond one octave can be seen in FIG. 5. To accommodate remote notes, additional staff can be added above or below locally, with a number indicating the octave distance if the staves are not successive, see FIG. 6. By default, each descending staff is on a pitch set one octave below the staff immediately above it, unless otherwise specified.

Figure 7:
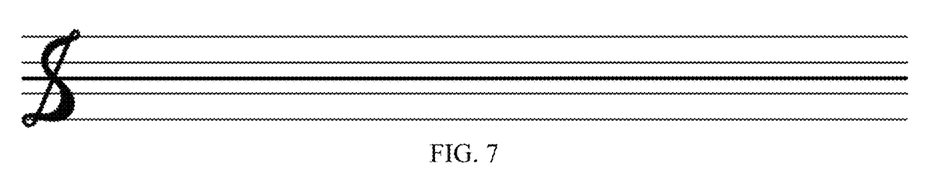
FIG. 7, is a diagram illustrating a modified SymD unit staff with tritone line bolded.
Figure 8:
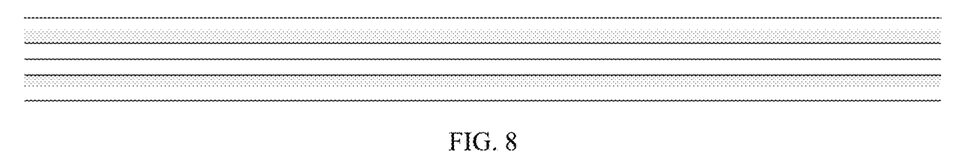
FIG. 8, is a diagram of a modified SymD unit staff, with mediant regions 3 & 9 shaded.

Modified versions can also be provided with bold middle line to emphasize the tritone symmetric center, see FIG. 7. Other versions include partitioning the two wider spaces into shaded and unshaded strips, to make the third degree more apparent for easy recognition of the intervals across these regions, see FIG. 8.

The invention also provides for a staff medium physically or electronically which is a blank except of one or more of the SymD staves discussed above, upon which a musical sequence and/or combination can be notated using the music notation system defined in the present invention.

5. Methods of Music Notations

Based on above description, present invention provides methods for visually representing a piece of music in 12 ET system. In one of the embodiments, the method may comprise steps of:

a) providing a unit staff comprising: five parallel lines numbered 1 to 5 arranged symmetrically to define eight spaces numbered 1 to 8 between and beside the lines, wherein three lines numbered 2, 3, 4 are in the middle part with Line 3 centrally positioned, these three lines are evenly spaced with Space 4 between Line 2 and Line 3, and Space 5 between Line 3 and Line 4; two lines numbered 1 and 5 are peripherally positioned with Line 1 outside Line 2 and Line 5 outside Line 4, and Line 1 and Line 5 each sets a gap wider than the Spaces 4 and 5; Gap 1 between Line 1 and Line 2 is evenly divided into two spaces, with Space 2 beside Line 1 and Space 3 beside Line 2; Gap 2 between Line 5 and Line 4 is in the same width as Gap 1, and evenly divided into Space 6 beside Line 4 and Space 7 beside Line 5; two additional spaces are defined as Space 1 outside Line 1 and Space 8 outside Line 5, this thirteen unique locations including five on the lines and eight in the spaces are defined, with location 0 set in the Space 1, location 1 on Line 1, location 2 in Space 2, location 3 in Space 3, location 4 on Line 2, location 5 in Space 4, location 6 on Line 3, location 7 in Space 5, location 8 on Line 4, location 9 in Space 6, location 10 in Space 7, location 11 on Line 5 and location 12/0' in Space 8;

b) with respect to a piece of music, determining music notes corresponding to said music's tones in terms of intervals to the music's tonic tone, along with each tone's inception time, then assigning the note for tonic unison to location 0, minor second to location 1, major second to location 2, minor third to location 3, major third to location 4, fourth to location 5, tritone to location 6, fifth to location 7, minor sixth to location 8, major sixth to location 9, minor seventh to location 10, major seventh to location 11, and octave of tonic to location 12/0';

c) extending the unit staff lines along a time axis and putting the determined music notes at their inception times on the staff at their locations assigned in Step b.

A computer executable program for notating music sounds using above method can also be developed. In one of the embodiments, the program may include computer instructions for steps of:

(a) obtaining a first data set of music sounds;
(b) extracting a second data set of music notes and time index of incepting times by recognizing each of 12 ET tones in the music sounds at its incepting times in the first data set;
(c) generating a third data set of notation data by notating the music notes in the second data along with their time index into a notation data based on above discussed method; and
(d) converting the third data set into an image of music score in SymD notation.

Reversely, an automatic program for playing back the musical scores in SymD notation based on the same algorithm can be devised with the steps of:

(a) obtaining an image file of a musical score in SymD notation;
(b) generating a data set of 12 ET notes and their inception time by recognizing this information from the image file based on above discussed method;
(c) producing a sound file electronically or physically by generating 12 ET pitches on their inception time corresponding to the recognized note information.

The invention can give a method for notating a musical sequence and/or combination, the method including the steps of:

a. determining a note corresponding to a pitch that is to be represented;
b. representing said note using a note symbol and put it on a SymD staff as defined in the present invention; and
c. repeating (a) and (b) until the musical sequence and/or combination is complete.

In one of the embodiments, a method for converting a musical score into a score in SymD notation based on the above outline may include the steps of:

(a) obtaining a first data set from a file of a musical score;
(b) extracting a second data set of 12 ET notes and their time index of inception by recognizing note information in the first data set according to said musical score's notation rule;
(c) generating a third data set of notation data by representing the 12 ET notes along with their time index in the second data set, with SymD notation using the method discussed above; and (d) converting the third data set into an image of music score of SymD notation.

Figure 2:
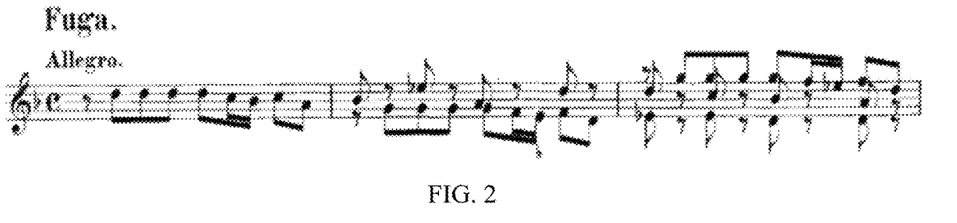
Figure 3:
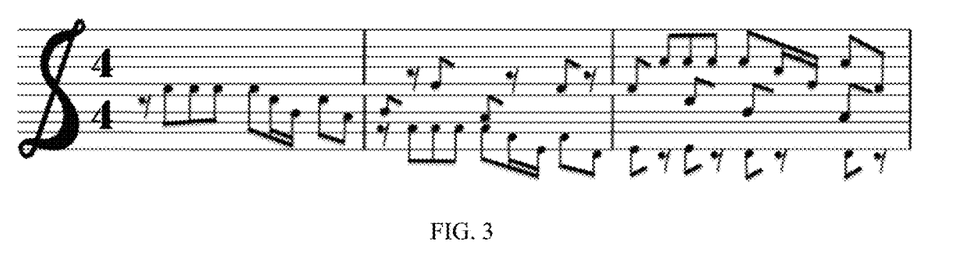

This method can be used to transcribe an existing musical sequence and/or combination in a traditional or alternative notation. A transcribed excerpt of J. S. Bach's Sonata I for Unaccompanied Violin (BMV 1001) in both conventional notation and present SymD notation can be seen in FIGS. 2 & 3. FIG. 3 is an part of SymD score produced via above method, in the standard D key, which fixes the note/pitch correspondence with Note 0 as pitch D.

The determination of the note to be represented can be done visually, aurally, or electronically. The method can also be implemented into a computer program to notate a musical sequence and/or combination in electronic form, which can be stored electronically and then viewed, printed or edited.

DESCRIPTION OF DRAWINGS

The invention is further depicted in following drawings.

In conclusion, the present SymD notation system provides a visible framework for a dynamic harmony space with 12 ET intervallic symmetry. SymD notation can serve as a visual harmonic reference for all 12 ET music scores, such as diatonic tonal music, non-centric diatonic music with floating tonality, non-diatonic centric music, or atonal music.

The invention claimed is:

1. A music staff for notating a 12-tone Equal Tempered music based musical score comprising consisting of one or multiple symmetric dodecaphonic harmony unit-staffs, wherein the unit staff consists of:
a grid of 5 parallel lines arranged symmetrically with respect to a center line, wherein 3 lines including the center line are in a middle line group defining two even spaces in between, 2 peripheral lines each at one side beside and each sets a gap with the middle line group;

these two gaps are in same width with each other, but wider than the two spaces in the middle line group, and each gap is divided evenly into two spaces with an inner space beside the middle line group, and an outer space beside the peripheral line; there are additional two outside spaces each outside one of the 2 peripheral lines; thus, 13 locations are formed on said 5 lines and in said 8 spaces.

2. The music staff according to claim 1, wherein the unit staff has a center line bolded.

3. The music staff according to claim 1, wherein the unit staff has both of the two inner spaces beside the middle line group shaded.

4. The music staff according to claim 1, wherein at least two unit staffs are stacked together, with one outside space outside one of the 2 peripheral lines overlapping with the other outside space outside the other peripheral line.

5. A music staff sheet for 12-tone Equal Tempered music notation having at least one unit staff of claim 1, wherein the music staff is printed on a physical medium or stored and displayed electronically.

6. A method for visually representing a piece of music in 12-tone Equal Tempered music system in symmetric dodecaphonic harmony notation, comprising steps of:
  a) providing a unit staff or multiple unit staffs stacking together, where the unit staff consists of: five parallel lines numbered 1 to 5 arranged symmetrically to define eight spaces numbered 1 to 8 between and beside the lines, wherein three lines numbered 2, 3, 4 are in the middle part with Line 3 centrally positioned, these three lines are evenly spaced with Space 4 between Line 2 and Line 3; and Space 5 between Line 3 and Line 4; two lines numbered 1 and 5, are peripherally positioned with Line 1 outside Line 2 and Line 5 outside Line 4, and Line 1 and Line 5 each sets a gap wider than the Spaces 4 and 5; Gap 1 between Line 1 and Line 2 is evenly divided into two spaces, with Space 2 beside Line 1 and Space 3 beside Line 2; Gap 2 between Line 5 and Line 4 is in the same width as Gap 1, and evenly divided into Space 6 beside Line 4 and Space: 7 beside Line 5; two additional spaces are defined as Space 1 outside Line 1 and Space 8 outside Line 5, these thirteen unique locations including five on the lines and eight in the spaces are defined, with location 0 set in the Space 1, location 1 on Line 1, location 2 in Space 2, location 3 in Space 3, location 4 on Line 2, location 5 in Space 4, location 6 on Line 3, location 7 in Space 5, location 8 on Line 4, location 9 in Space 6, location 10 in Space 7, location 11 on Line 5 and location 12/0' in Space 8;
  b) with respect to a piece of music, determining music notes corresponding to said music's tones in terms of intervals to the music's tonic tone, along with each tone's inception time; then assigning the note for tonic unison to location 0, minor second to location 1, major second to location 2, minor third to location 3, major third to location 4, fourth to location 5, tritone to location 6, fifth to location 7, minor sixth to location 8, major sixth to location 9, minor seventh to location 10, major seventh to location 11, and octave of tonic to location 12/0';
  c) extending the unit staff lines along a time axis and putting the determined music notes at their inception times on the staff at their locations assigned in Step b.

7. A computer executable program for notating music sounds based on the method of claim 6, comprising computer instructions for steps of:
  (a) obtaining a first data set of music sounds;
  (b) extracting a second data set of music notes and time index of incepting times from the first data set by recognizing each of 12-tone Equal Tempered music tones in the music sounds at its incepting time;
  (c) generating a third data set of notation data by notating the music notes in the second data along with their time index, using the method of claim 6; and
  (d) converting the third data set into an image of music score in symmetric dodecaphonic harmony notation.

8. A automatic program for playing musical scores in symmetric dodecaphonic harmony notation based on the method of claim 6, comprising:
  (a) obtaining an image file of a musical score in symmetric dodecaphonic harmony notation;
  (b) generating a data set of 12-tone Equal Tempered music notes and their inception time by recognizing these information from the image file according to the method of claim 6;
  (c) producing a sound electronically or physically by generating 12-tone Equal Tempered music pitches on their inception times corresponding to the recognized information in the data set in step (b).

9. A method for converting a musical score into a score in symmetric dodecaphonic harmony notation based on the method of claim 6, comprising:
  (a) obtaining a first data set from a file of a musical score;
  (b) extracting a second data set of 12-tone Equal Tempered music notes and their time index of inception by recognizing these note information in the first data set according to said musical score's notation rule;
  (c) generating a third data set of notation data by representing the 12-tone Equal Tempered music notes along with their time index in the second data set, in symmetric dodecaphonic harmony notation using the method of claim 6; and
  (d) converting the notation data in the third data set of Step (c) into an image of music score in symmetric dodecaphonic harmony notation.

* * * * *